United States Patent
Aoyama

(10) Patent No.: US 6,843,743 B2
(45) Date of Patent: Jan. 18, 2005

(54) BELT FOR CONTINUOUSLY VARIABLE TRANSMISSION

(75) Inventor: Hideaki Aoyama, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 146 days.

(21) Appl. No.: 10/213,443

(22) Filed: Aug. 7, 2002

(65) Prior Publication Data

US 2003/0032513 A1 Feb. 13, 2003

(30) Foreign Application Priority Data

Aug. 10, 2001  (JP) ........................................ 2001-244643

(51) Int. Cl.⁷ ................................................ F16G 5/16
(52) U.S. Cl. ...................................................... 474/242
(58) Field of Search ............................... 474/242, 201, 474/248, 245, 240; 29/450

(56) References Cited

U.S. PATENT DOCUMENTS

| | | | | |
|---|---|---|---|---|
| 3,949,621 A | * | 4/1976 | Beusink et al. | ............. 474/201 |
| 4,338,081 A | * | 7/1982 | Hattori et al. | .............. 474/201 |
| 4,498,892 A | * | 2/1985 | Huntley | ...................... 474/242 |
| 4,580,998 A | * | 4/1986 | Brown | ........................ 474/201 |
| 6,270,437 B1 | * | 8/2001 | Yoshida et al. | ............. 474/248 |
| 6,342,020 B1 | * | 1/2002 | Aoyama | ..................... 474/242 |
| 6,440,023 B2 | * | 8/2002 | Kanehara et al. | ........... 474/242 |

FOREIGN PATENT DOCUMENTS

| | | | | |
|---|---|---|---|---|
| EP | 0 421 804 A1 | | 10/1991 | |
| EP | 0 781 939 A1 | | 7/1997 | |
| EP | 0964184 | * | 12/1999 | ............ F16G/5/16 |
| JP | 58 152956 | | 9/1983 | |
| JP | 2-19338 | | 8/1985 | |
| JP | 61 002945 A | | 1/1986 | |
| JP | 02-300544 | * | 12/1990 | ................. 474/242 |
| JP | 11-108123 A | * | 4/1999 | ............ F16G/5/16 |
| JP | 2002-233920 A | * | 8/2002 | ............ F16G/5/16 |

OTHER PUBLICATIONS

Paten Abstracts of Japan 11236948 Mar. 31, 1999.
European Search Report.

* cited by examiner

Primary Examiner—Marcus Charles
(74) Attorney, Agent, or Firm—Arent Fox PLLC

(57) ABSTRACT

In a metal belt for a continuously variable transmission, when a laterally inner end of a metal ring assembly abuts a neck, a laterally outer end of the metal ring assembly is positioned at a location displaced toward the neck from a laterally outer end of an ear. When the metal belt is transported as an independent item or even when assembled to the continuously variable transmission, contact with another article with the laterally outer end of the metal ring assembly is prohibited by a laterally outer end of the ear to prevent damage to the metal ring assembly and the metal ring assembly from falling off of the ring slot. In addition, the entire widthwise region of the metal ring assembly is opposite to the lower ear face, so that a sufficient amount of oil is retained on the opposite surface, to enhance a metal element-cooling effect.

1 Claim, 6 Drawing Sheets

US 6,843,743 B2

BELT FOR CONTINUOUSLY VARIABLE TRANSMISSION

BACKGROUND OF THE INVENTION

1. Field of the Invention

The present invention relates to a belt for a continuously variable transmission in which a pair of metal ring assemblies are supported in a pair of ring slots and include a plurality of metal elements. Particularly, the invention relates to a belt for a continuously variable transmission in which each ring slot in the metal element is defined by an element body, a neck, and an ear. The element body includes a pulley-abutment face abutting a V-face of a pulley and a saddle face supporting an inner peripheral surface of the metal ring assemblies while the ear includes a lower ear face opposite an outer peripheral surface of the metal ring assembly with a gap defined therebetween.

2. Description of the Related Art

A conventional belt for the continuously variable transmission is known from the disclosure of Japanese Patent Publication No. 2-19338, in which a metal element is formed so that the width of the lower ear face facing the ring slot is less than 75% relative to the width of the metal ring assembly, thereby reducing the weight of the metal element. The lower ear face of the metal element is inclined at 2° to 5° so that the ring slot has an outwardly increasing groove width, and the lower ear face is formed into a curved convex face opposite the outer peripheral surface of the metal ring assembly. The structural configuration of the conventional metal assembly provides optimal interference between the lower ear face and the metal ring assembly to prevent premature wear of the metal ring.

In the conventional belt, however, since the width of the lower ear face is less than 75% relative to the width of the metal ring assembly, a laterally outer end of the metal ring assembly protrudes to a great extent outwardly from the ring slot. Therefore, when the metal belt formed by assembling the metal elements to the metal ring assemblies is transported as an independent item or even when assembled to the continuously variable transmission, the laterally outer end of the metal ring assembly protruding from the metal element tends to interfere with other articles, leading to the outermost metal rings being significantly damaged. The outermost metal rings are exposed to severe conditions mostly among a plurality of the laminated metal rings, and the damage to the outermost metal rings greatly affects and diminishes the durability of the entire metal belt.

Also, the conventional belt suffers from the problem of the metal ring assembly falling from the slot during transportation or assembling of the belt because the laterally outer end of the metal ring assembly protrudes extensively outward from the ring slot. Therefore, a clamp or tie-lap is required to prevent the metal ring assembly from falling, which leads to an increase in the number of assembling steps and cost.

SUMMARY OF THE INVENTION

Accordingly, it is an object of the present invention to overcome the above-described drawbacks of the conventional belt for continuously variable transmissions. It is also an object of the present invention to avoid or prevent the damage to the outermost metal rings of the metal elements during transportation or assembling of the belt for the continuously variable transmission. It is another object of the present invention to ensure the heat dissipation ability of the metal elements during operation of the continuously variable transmission is maintained.

To achieve the above-described objects, according to a preferred embodiment of the present invention, there is provided a belt for a continuously variable transmission including a pair of metal ring assemblies supported in a pair of ring slots and having a plurality of metal elements. Each ring slot is defined by an element body, a neck, and an ear. The element body includes a pulley-abutment face that abuts a V-face of a pulley and a saddle face that supports an inner peripheral surface of each metal ring assembly. The ear include a lower ear face opposite an outer peripheral surface of each metal ring assembly with a gap defined therebetween. Thus, in a state in which a laterally inner end of the metal ring assembly is abutting the neck, a laterally outer end of the metal ring assembly is positioned at a location displaced toward the neck from a laterally outer end of the ear.

With this arrangement, in the state in which the laterally inner end of the metal ring assembly is abutting the neck, the laterally outer end of the metal ring assembly is positioned at the location displaced toward the neck from the laterally outer end of the ear. Therefore, when the belt for the continuously variable transmission is transported as an independent item or even when assembled to the continuously variable transmission, the interference between the laterally outer end of the metal ring assembly and other articles is avoided by the laterally outer end of the ear, which prevents damaging the metal ring assembly and the metal ring assembly from falling from the ring slot. In addition, since the entire widthwise region of the metal ring assembly is opposite to the lower ear face of the metal element, a sufficient amount of oil is retained on the opposite surface to enhance the cooling of the metal element.

According to a second embodiment of the present invention, there is provided a belt for a continuously variable transmission including a pair of metal ring assemblies supported in a pair of ring slots and having a plurality of metal elements. Each ring slot is defined by an element body, a neck, and an ear. The element body includes a pulley-abutment face that abuts a V-face of a pulley and a saddle face that supports an inner peripheral surface of each metal ring assembly. The ear includes a lower ear face opposite an outer peripheral surface of each metal ring assembly with a gap defined therebetween. Thus, in a state in which a laterally inner end of the metal ring assembly is abutting the neck, a laterally outer end of the metal ring assembly is positioned at a location displaced toward the neck from a line tangent to a laterally outer end of the element body and a laterally outer end of the ear.

With this arrangement, in the state in which the laterally inner end of the metal ring assembly is abutting the neck, the laterally outer end of the metal ring assembly is positioned at the location displaced toward the neck from the line tangent to the laterally outer end of the element body and the laterally outer end of the ear. Therefore, when the belt for the continuously variable transmission is transported as an independent item or even when assembled to the continuously variable transmission, the interference between the laterally outer end of the metal ring assembly and other articles is avoided by the laterally outer end of the ear and the laterally outer end of the element body, which prevents damaging the metal ring assembly and the metal ring assembly from falling from the ring slot. In addition, since the substantially entire widthwise region of the metal ring assembly is opposite to the lower ear face of the metal element, a sufficient amount of oil is retained on the opposite surface to enhance cooling of the metal elements.

According to a third embodiment of the present invention, the laterally outer end of the metal ring assembly is positioned at a location displaced from the laterally outer end of the ear in a direction opposite from the neck.

With this arrangement, since the laterally outer end of the metal ring assembly is positioned at the location displaced from the laterally outer end of the ear in the direction opposite from the neck, the width of the ear is minimized to reduce the weight of the metal element.

A driving pulley 6 and a driven pulley 11 in the preferred, second, and third embodiments correspond to the pulley of the present invention.

BRIEF DESCRIPTION OF THE DRAWINGS

The above and other objects, features and advantages of the invention will become apparent from the following description of the preferred embodiments taken in conjunction with the accompanying drawings, wherein.

Figure 2:
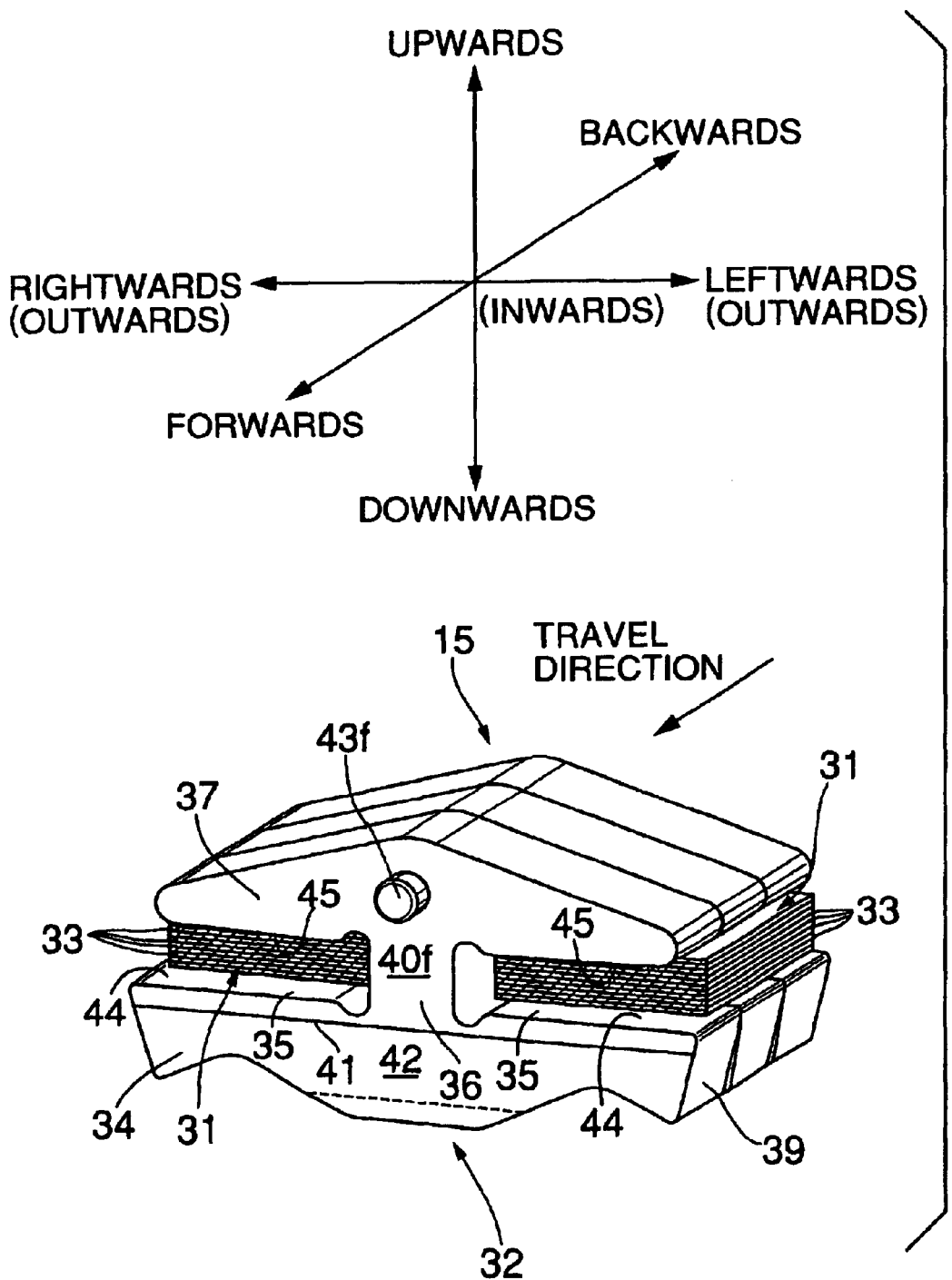
FIG. 2 is a partial perspective view of a metal belt according to a preferred embodiment of the present invention.

The terms of forwards and backwards, leftwards and rightwards, radially outwards and radially inwards are defined in FIG. 2.

DESCRIPTION OF THE PREFERRED EMBODIMENTS

A preferred embodiment of the present invention will be described with reference to FIGS. 1 to 4.

Figure 1:
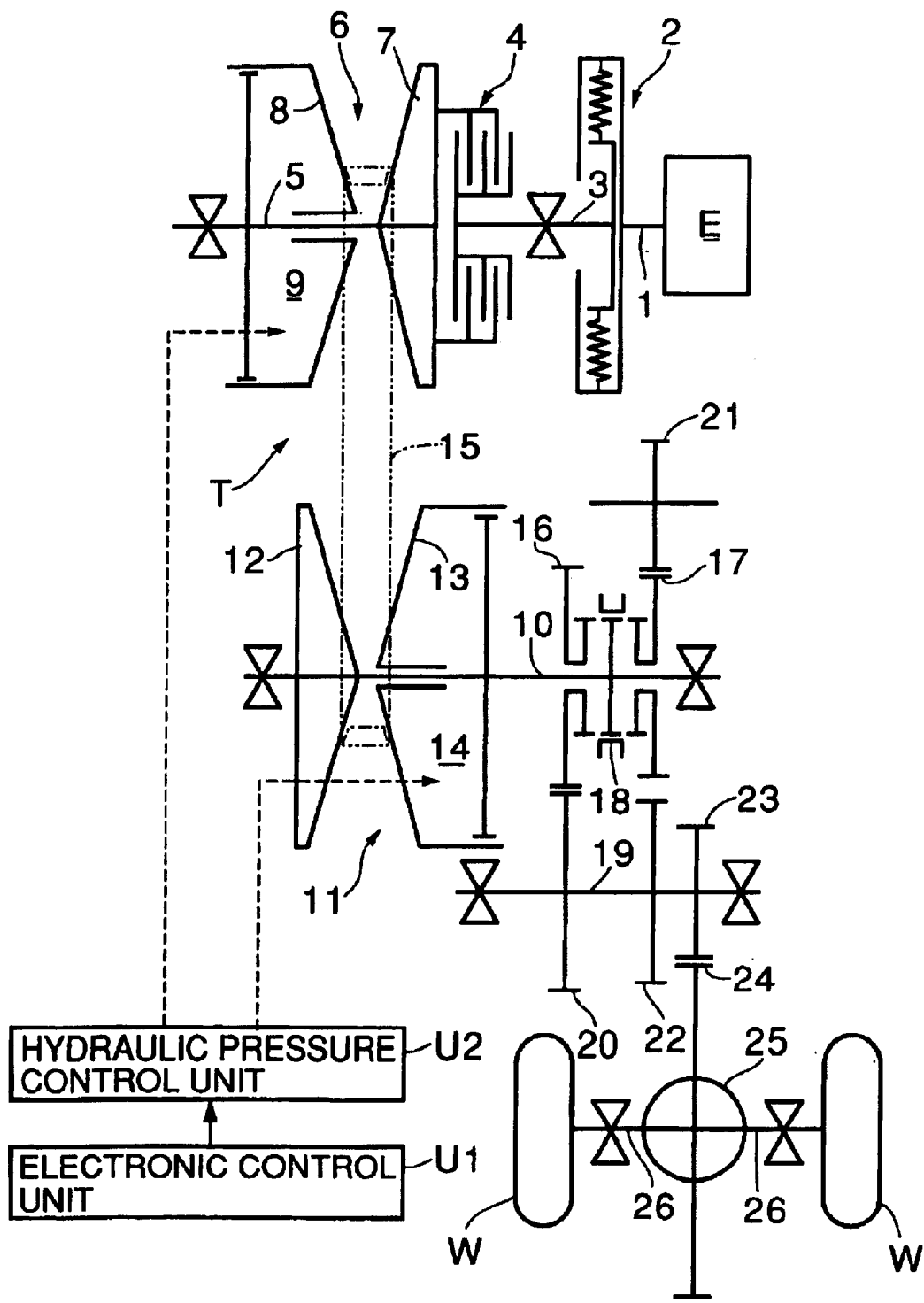
FIG. 1 is a schematic diagram of a power transmitting system in a vehicle having a continuously variable transmission.

FIG. 1 illustrates a schematic diagram of the arrangement of a metal-belt type continuously variable transmission T mounted in an automobile. An input shaft 3 connected through a damper 2 to a crankshaft 1 of an engine E is connected through a starting clutch 4 to a driving shaft 5 of the metal-belt type continuously variable transmission T. A driving pulley 6 mounted on the driving shaft 5 includes a stationary pulley half 7 secured to the driving shaft 5 and a movable pulley half 8 capable of moving toward and away from the stationary pulley half 7. The movable pulley half 8 is urged toward the stationary pulley half 7 by a hydraulic pressure applied to an oil chamber 9.

A driven pulley 11 is mounted on a driven shaft 10 disposed in parallel to the driving shaft 5 and includes a stationary pulley half 12 secured to the driven shaft 10, as well as a movable pulley half 13 capable of moving toward and away from the stationary pulley half 12. The movable pulley half 13 is urged toward the stationary pulley half 12 by a hydraulic pressure applied to an oil chamber 14. A metal belt 15, including a plurality number of metal elements 32 supported on a pair of left and right metal ring assemblies 31, 31, is reeved between the driving pulley 6 and the drive pulley 11 (see FIG. 2). Preferably each metal ring assembly 31 has twelve metal rings 33 laminated onto one another.

A forward driving gear 16 for the forward movement of a vehicle and a backward driving gear 17 for the backward movement of the vehicle are relatively rotatably carried on the driven shaft 10, and are selectively coupled to the driven shaft 10 by a selector 18. A forward driven gear 20 meshed with the forward driving gear 16 and a backward driven gear 22 meshed with the backward driving gear 17 through a backward idling gear 21 are secured to an output shaft 19 disposed in parallel to the driven shaft 10.

The rotation of the output shaft 19 is input to a differential 25 through a final driving gear 23 and a final driven gear 24, and transmitted therefrom through left and right axles 26, 26 to driven wheels W, W.

A driving force from the engine E is transmitted to the driven shaft 10 through the crankshaft 1, the damper 2, the input shaft 3, the starting clutch 4, the driving shaft 5, the driving pulley 6, the metal belt 15 and the driven pulley 11. When a forward travel direction is selected, the driving force from the driven shaft 10 is transmitted through the forward driving gear 16 and the forward driven gear 20 to the output shaft 19 to move the vehicle forward. When a backward or reverse travel direction is selected, the driving force from the driven shaft 10 is transmitted through the backward driving gear 17, the backward idling gear 21 and the backward driven gear 22 to the output shaft 19 to move the vehicle backwards or in reverse.

In these processes, the hydraulic pressures applied to the oil chamber 9 in the driving pulley 6 and the oil chamber 14 in the driven pulley 11 is controlled by a hydraulic pressure control unit U2 operated by a command from an electronic control unit U1 to continuously regulate the gear change ratio of the transmission T. More specifically, if the hydraulic pressure applied to the oil chamber 14 in the driven pulley 11 is increased relative to the hydraulic pressure applied to the oil chamber 9 in the driving pulley 6, the groove width of the driven pulley 11 decreases, thereby increasing the effective radius. Correspondingly, the groove width of the drive pulley 6 increases, thereby reducing the effective radius. Therefore, the gear change ratio of the metal-belt type continuous variable transmission T is continuously varied toward "LOW".

On the other hand, if the hydraulic pressure applied to the oil chamber 9 in the drive pulley 6 is increased relative to the hydraulic pressure applied to the oil chamber 14 in the driven pulley 11, the groove width of the driving pulley 6 decreases, thereby increasing the effective radius. Correspondingly, the groove width of the driven pulley 11 is increased, thereby reducing the effective radius. Therefore, the change gear ratio of the metal-belt type continuous variable transmission T is continuously varied toward "OD".

Figure 3:
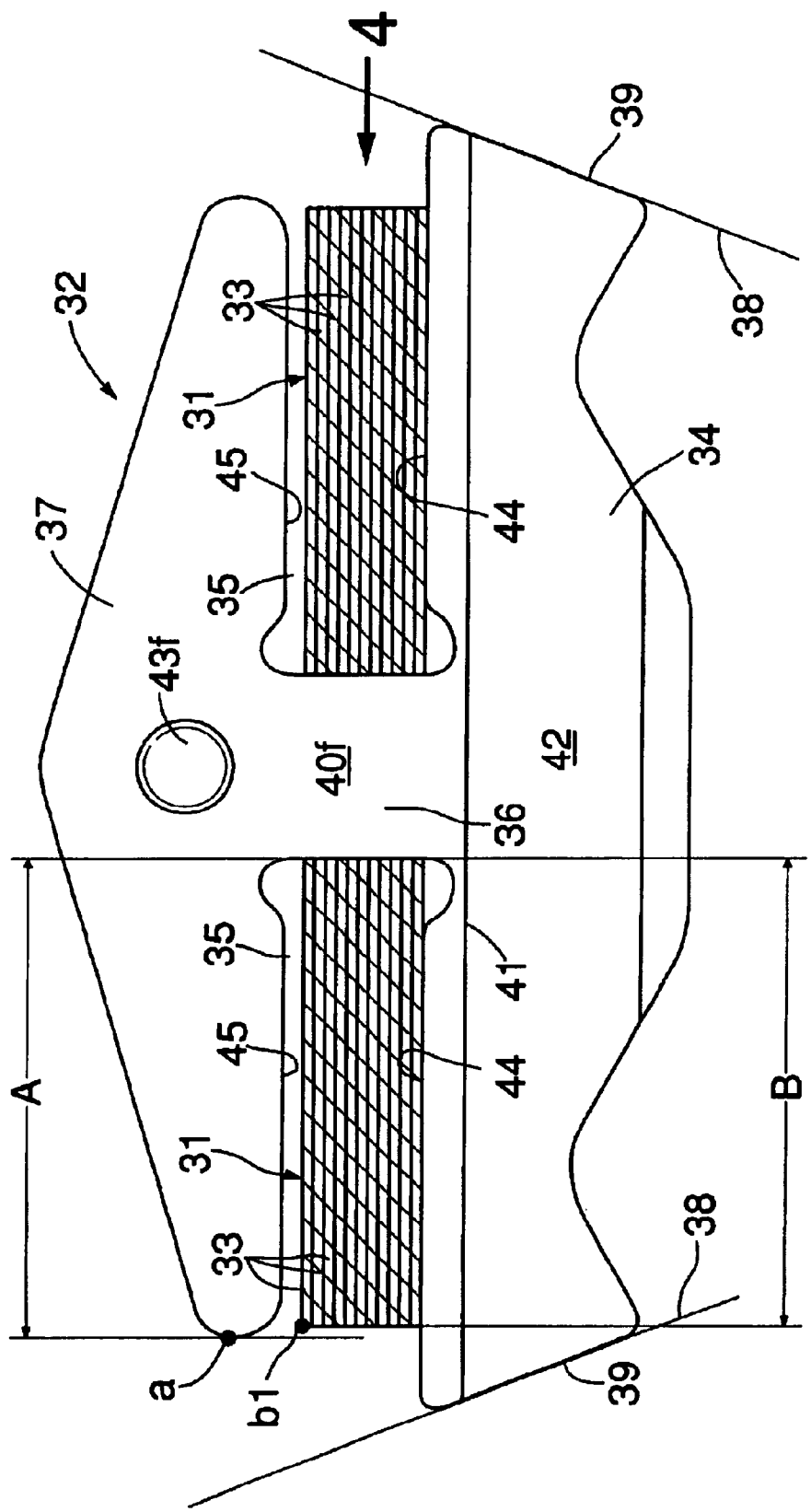
FIG. 3 is a front view of a metal element of the metal belt shown in FIG. 2.
Figure 4:
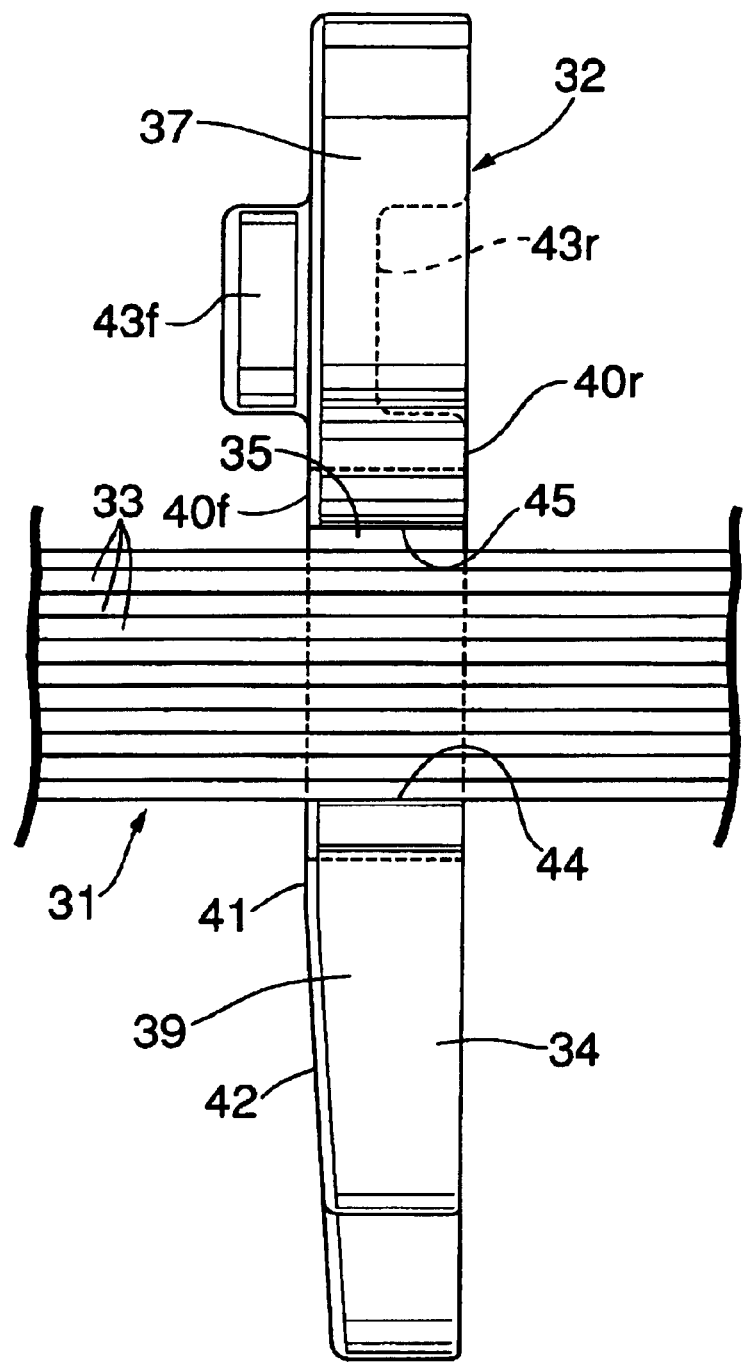
FIG. 4 is a side view of the metal element shown in FIG. 3 taken in a direction of an arrow 4.

As shown in FIGS. 2 to 4, each of the metal element 32 is punch formed from a metal plate and includes a substantially trapezoidal element body 34, a neck 36 located between a pair of left and right ring slots 35, 35 for receiving the metal ring assemblies 31, 31, and a substantially triangular ear 37 connected to an upper portion of the element body 34 through the neck 36. The element body 34 has a pair of pulley abutment faces 39, 39 formed at laterally outer ends that abut V-faces 38, 38 (see FIG. 3) of the driving pulley 6 and the driven pulley 11. Each metal element 32 has a pair of front and rear main faces 40f, 40r formed on front and rear sides in a travel direction of the metal element 32 in such a manner that the front and rear main faces 40f, 40r are perpendicular relative to the travel direction of the metal element 32 and parallel to each other. An inclined face 42 is formed on the side of the metal element 32 below the front main face 40f with a laterally extending locking edge 41 interposed therebetween. Further, a projection 43f and a recess 43r circular in section and capable of being loosely fitted within each other are formed on the surface of the front main face 40f and the surface of the rear main face 40r of the ear 37 in order to couple the longitudinally adjacent metal elements 32, 32 to each other. Radially inner edges and radially outer edges of the ring slots 35, 35 are called saddle faces 44, 44 and lower ear faces 45, 45, respectively. Inner peripheral surfaces of the metal ring assemblies 31, 31 abut the saddle faces 44, 44, and a small gap is provided between each outer peripheral surface of the metal ring assemblies 31, 31 and corresponding lower ear face 45, 45.

As seen in FIG. 3, a lateral length A of the ear 37 as measured from a bottom of the ring slot 35, in other words a lateral length A of the lower ear face 45, is set to be larger than a width B of the metal ring assembly 31. Therefore, when a laterally inner end of the metal ring assembly 31 abuts the neck 36, a laterally outer end b1 of the metal ring assembly 31 is positioned at a location toward the neck 36 relative to a laterally outer end a of the ear 37. During operation of the metal-belt type continuously variable transmission T, the laterally inner end of the metal ring assembly 31 is not abutting the bottom of the ring slot 35, thus a gap is defined therebetween.

Because the lateral length A of the lower ear face 45 is set to be larger than the width B of the metal ring assembly 31 as described above, when the metal belt 14 having a plurality of metal elements 32 carried on the pair of metal ring assemblies 31, 31 is transported to a factory for assembling the metal-belt type continuously variable transmission T, or when the metal belt 15 is assembled to the metal-belt type continuously variable transmission T in the assembling factory, even if another article is brought into contact with the laterally outer end of the metal ring assembly 31, the metal ring assembly 31 is displaced to a position where the laterally inner end abuts the bottom of the ring slot 35 so that the metal ring assembly 31 is prevented from being damaged by a strong shock from the another article. More particularly, before the laterally inner end of the metal ring assembly 31, which is being pushed by the another article to move, abuts the bottom of the ring slot 35, the other article abuts the laterally outer end a of the ear 37 so that further movement of the ear 37 is prohibited. Therefore, the damage to the laterally outer and inner ends of the metal ring assembly 31 is prevented.

In addition, because the lateral length A of the lower ear face 45 is set to be larger than the width B of the metal ring assembly 31, that is, the depth of the ring slot 45 is sufficiently large, the metal ring assembly 31 is housed completely within the ring slot 45. Therefore, during transportation or assembling, the metal ring assembly 31 is unlikely to fall from the metal elements 32, such that a clamp or a tie-lap that prevents the metal ring assembly 31 from falling is not required, which results in reducing assembly steps and cost. Moreover, because the entire widthwise region of the metal ring assembly 31 is opposite to the lower ear face 45 of the metal element 32, even if the temperature of the metal elements 32 rises due to heat generated by frictional contact with the V-face 38 of the pulley during operation of the metal-belt type continuously variable transmission T, a sufficient amount of oil is retained on the opposite region to effectively cool the metal element 32, thereby suppressing the deterioration of the oil due to the high temperature of the metal belt 15.

As the lateral length A of the lower ear face 45 is larger than the width B of the metal ring assembly, the effect of protecting the metal ring assembly 31 is higher, but the weight of the metal element 32 increases as a result of the increase in the lateral length A. As a result, centrifugal force acting on the metal element 32 during operation of the metal-belt continuously variable transmission T increases leading to a decrease in the durability of the metal ring assembly 31. Therefore, it is appropriate to set the lateral length A of the lower ear face 45 to be slightly larger than the width B of the metal ring assembly 31.

Figure 5:
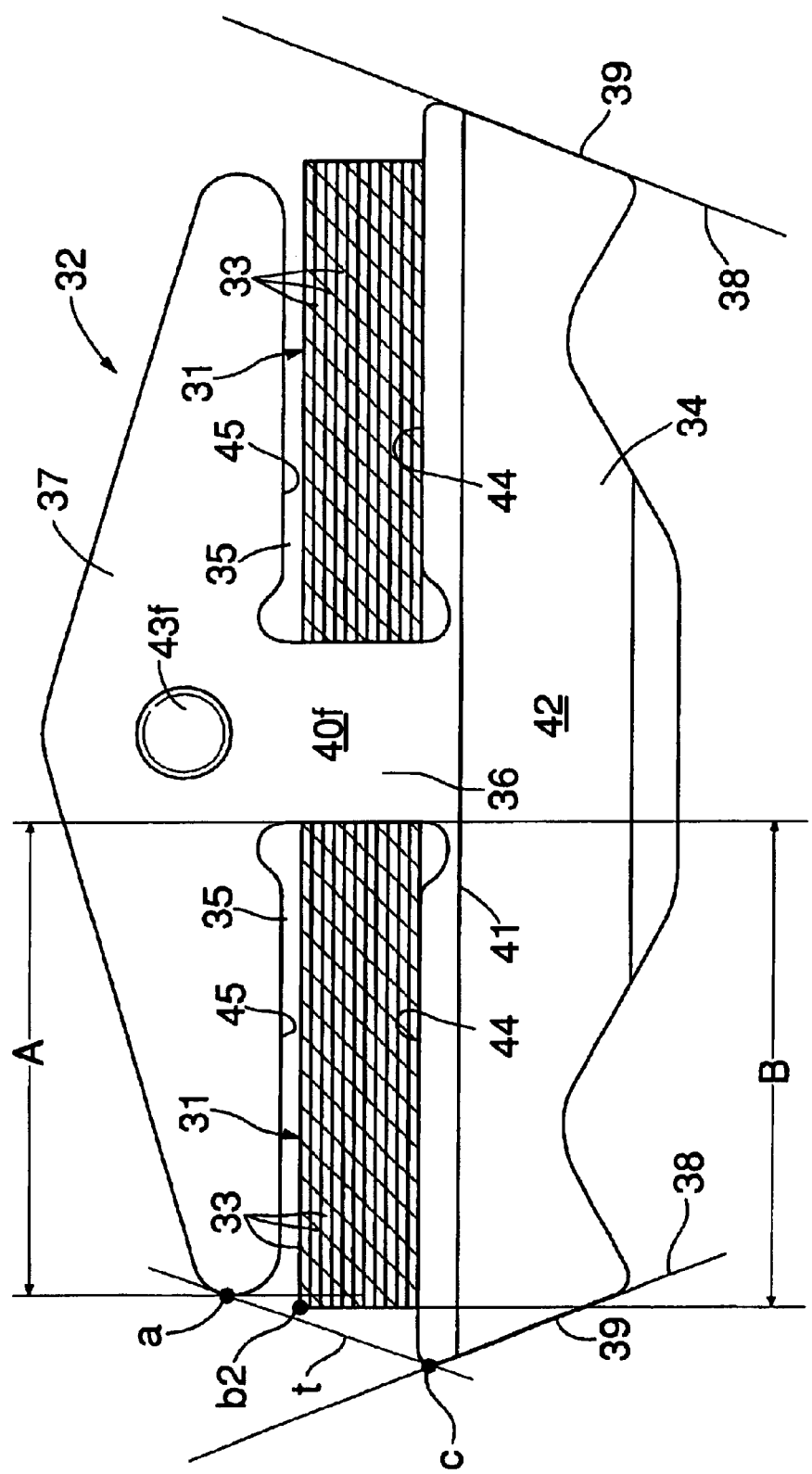
FIG. 5 is a front view of a metal element according to a second embodiment of the present invention.

A second embodiment of the present invention will now be described with reference to FIG. 5.

In the second embodiment, when a tangent line t is drawn between the laterally outer end a of the ear 37 of the metal element 32 and the laterally outer end c of the element body 34 and the laterally inner end of the metal ring assembly 31 is put into abutment against the bottom of the ring slot 35, a laterally outer end b2 of the metal ring assembly 31 is positioned at a location displaced toward the neck 36 from the tangent line t. Therefore, if another article has a flat face having a size such that the face simultaneously abuts the laterally outer end a of the ear 37 and the laterally outer end c of the element body 34, the damage to the metal ring assembly 31 can be reliably prevented. In addition, the metal ring assembly 31 is prevented from falling off the metal element 32 in a manner similar to that in the above-described preferred embodiment.

In the second embodiment, the lateral length A of the lower ear face 45 is reduced to be smaller than that in the preferred embodiment, which is advantageous in that the weight of the metal element 32 is reduced. However, the effect of protecting the metal ring assembly 31 from interference by another article having a projecting shape is reduced in correspondence to an extent that the position of the laterally outer end b2 of the metal ring assembly 31 relative to the laterally outer end a of the ear 37 is displaced outwardly from the position of the laterally outer end b1 of the metal ring assembly 31 in the preferred embodiment.

Figure 6C:
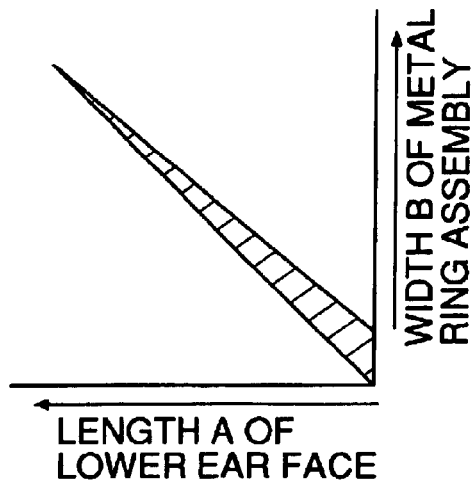
FIGS. 6A, 6B, and 6C are graphs illustrating a comparison of regions that satisfy conditions for the first and second embodiments.
Figure 6B:
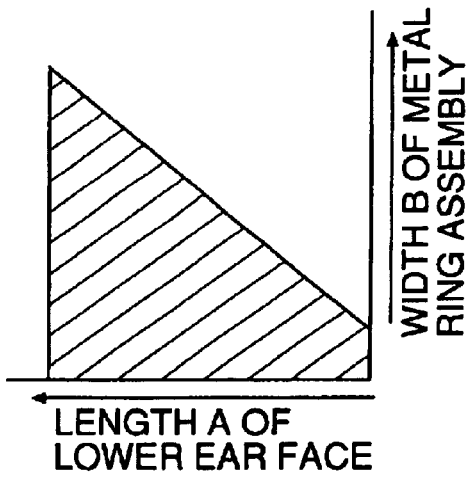
Figure 6A:
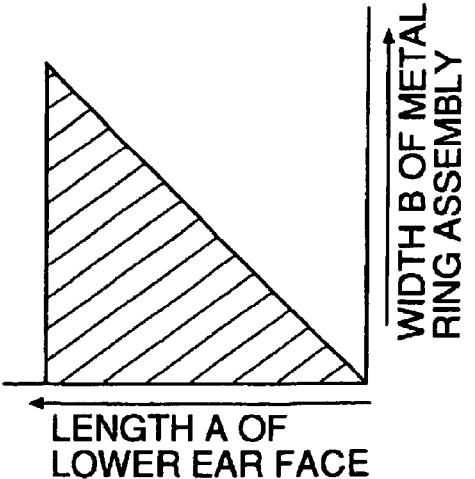

FIGS. 6A to 6C provide graphs showing the relationship between the lateral length A of the lower ear face 45 and the width B of the metal ring assembly 31, where damage to the metal ring assembly 31 is prevented. FIG. 6A corresponds to the preferred embodiment, wherein a hatched region where the lateral length A of the lower ear face 45 is larger than the width B of the metal ring assembly 31 satisfies the conditions for preventing the damage. An upper limit for the lateral length A of the lower ear face 45 is determined for when the laterally outer end a of the ear 37 interferes with the V-face 38 of the pulley. FIG. 6B corresponds to the second embodiment, wherein a hatched region where the laterally outer end b2 of the metal ring assembly 31 is positioned at the location displaced toward the neck 36 from the tangent line t satisfies the conditions for preventing the damage. As can be seen from comparison between FIGS. 6A and 6B, if the conditions in the preferred embodiment shown in FIG. 6A are satisfied, the conditions in the second embodiment shown in FIG. 6B are automatically satisfied.

A hatched region in FIG. 6C is a region where a further condition is added to the conditions in the second embodiment. The further condition is that, when the laterally inner end of the metal ring assembly 31 is abutting the bottom of the ring slot 35, the laterally outer end b2 is positioned at a location displaced from the laterally outer end a in a direction opposite from the neck 36. A state shown in FIG. 5 corresponds to the hatched region in FIG. 6C. By adding this condition, the lateral length A of the lower ear face 45 is reduced to a value as small as possible, thereby reducing the weight of the metal element 32, and alleviating the load applied to the metal ring assembly 31 by centrifugal force acting on the metal elements 32 during the operation of the metal-belt type continuously variable transmission T.

Although the preferred embodiments of the present invention have been described in detail, it will be understood that the present invention is not limited to the above-described embodiments, and various modifications in design may be made without departing from the spirit and scope of the invention defined in the claims.

What is claimed is:

1. A belt for a continuously variable transmission comprising:
   a pair of metal ring assemblies supported in a corresponding pair of ring slots wherein each ring slot is formed in a plurality of metal elements and is defined by an element body, a neck, and an ear;
   said element body includes a pulley-abutment face abutting a V-face of a pulley and a saddle face that supports an inner peripheral surface of each metal ring assembly; and
   said ear includes a lower ear face opposite to an outer peripheral surface of each of said metal ring assemblies with a gap defined therebetween,
   wherein, in a state in which a laterally inner end of said metal ring assembly is abutting said neck, a laterally outer end of each of said metal ring assemblies is positioned at a location on a neck side of a line tangent to a laterally outer end of said element body and a laterally outer end of said ear, and
   wherein in said state the laterally outer end of each of said metal ring assemblies is positioned at a location outer than the laterally outer end of said ear.

* * * * *